United States Patent
Malhotra et al.

(10) Patent No.: US 12,284,192 B2
(45) Date of Patent: Apr. 22, 2025

(54) REAL-TIME APPLICATION STATE MONITORING, WHITE LIST PROFILE INSTANTIATION, BEHAVIORAL DETECTION AND AUTOMATIC CYBER ATTACK DEFENSE (BUSHIDO)

(71) Applicants: Sameer Malhotra, Short Hills, NJ (US); Nazario Parsacala, Piscataway, NJ (US)

(72) Inventors: Sameer Malhotra, Short Hills, NJ (US); Nazario Parsacala, Piscataway, NJ (US)

(73) Assignee: TRUEFORT, INC., Weehawken, NJ (US)

( * ) Notice: Subject to any disclaimer, the term of this patent is extended or adjusted under 35 U.S.C. 154(b) by 355 days.

(21) Appl. No.: 15/389,725

(22) Filed: Dec. 23, 2016

(65) Prior Publication Data

US 2018/0183818 A1    Jun. 28, 2018

(51) Int. Cl.
   *H04L 9/40*    (2022.01)
(52) U.S. Cl.
   CPC ...... *H04L 63/1416* (2013.01); *H04L 63/1425* (2013.01)

(58) Field of Classification Search
   CPC .............. H04L 63/1416; H04L 63/1425
   USPC .............................................. 726/4
   See application file for complete search history.

(56) References Cited

U.S. PATENT DOCUMENTS

| | | | |
|---|---|---|---|
| 7,234,073 B1 * | 6/2007 | Roytman | G06F 11/2025 714/4.11 |
| 7,401,057 B2 * | 7/2008 | Eder | G06N 5/022 706/20 |
| 7,954,090 B1 * | 5/2011 | Qureshi | G06F 11/079 717/127 |
| 2018/0032997 A1 * | 2/2018 | Gordon | G06Q 20/3224 |

* cited by examiner

*Primary Examiner* — Benjamin A Kaplan
(74) *Attorney, Agent, or Firm* — JUNEAU & MITCHELL; Todd L. Juneau (57) ABSTRACT

Methods, computer readable media, and apparatuses for real-time application state monitoring, white list profile instantiation, behavioral detection and automatic cyber-attack defense are presented. For example, according to one aspect, multiple application behavioral metrics are received from multiple behavioral metric collection agents. At least some of the behavioral metrics are identified based on an association with an application profile or common entity. The identified behavioral metrics are utilized to evaluate whether behavioral conditions specified by application white lists, policies and or security policies associated with the common entity have been satisfied. Responsive to evaluating that a behavioral condition has been deviated, an alert is generated and communicated to one or more response devices associated with the common entity.

4 Claims, 6 Drawing Sheets

Application Profiling and Tuning

FIG. 3

FIG. 4
Scaling Globally

FIG. 5

Application Segmentation Profile Logic

FIG. 6

REAL-TIME APPLICATION STATE MONITORING, WHITE LIST PROFILE INSTANTIATION, BEHAVIORAL DETECTION AND AUTOMATIC CYBER ATTACK DEFENSE (BUSHIDO)

Enterprise data breach or malicious attack on application services are an exponentially increasing problem. Traditional defense mechanisms using just malware detection, virus detection or perimeter fencing with firewalls are no longer adequate. Threat actors are becoming more motivated, sophisticated, and attack surface has increased due to influx of BYOD and IOT. Most data breaches are accomplished via internal compromises from either rogue employees or social engineering. Effective measures are therefore needed to automatically finger print and profile each application within the enterprise (application segmentation) and detect/thwart behavioral anomalies in real-time.

SUMMARY

The following presents a description of a complete application monitoring and cyber defense system based upon advanced application level segmentation, real-time behavior analytics, automatic application protection and full workflow orchestration for all enterprise technology to remediate immediate and residual threats. The system is designed with modularity in mind to accommodate flexible configuration. However, the complete ecosystem of these components inter-operating seamlessly is the key to this invention.

BRIEF DESCRIPTION OF THE DRAWINGS

The schematics in this document illustrate the entirety of all the required components for an advanced application level cyber defense system. Each labeled component is a self contained, modular component for configuration flexibility. Significant interactions between the components are also illustrated as labeled arrows.

The present disclosure is illustrated by way of example and not limited in the accompanying figures in which like reference numerals indicate similar elements and in which.

DETAILED DESCRIPTION

"Entities" are all technology assets in an enterprise. Collectively these components form the entire ecosystem of an organization's Information Technology and Data Processing capabilities. This includes servers, desktops, network switches, routers, databases, mobile devices, storage devices, etc.

Figure 1:
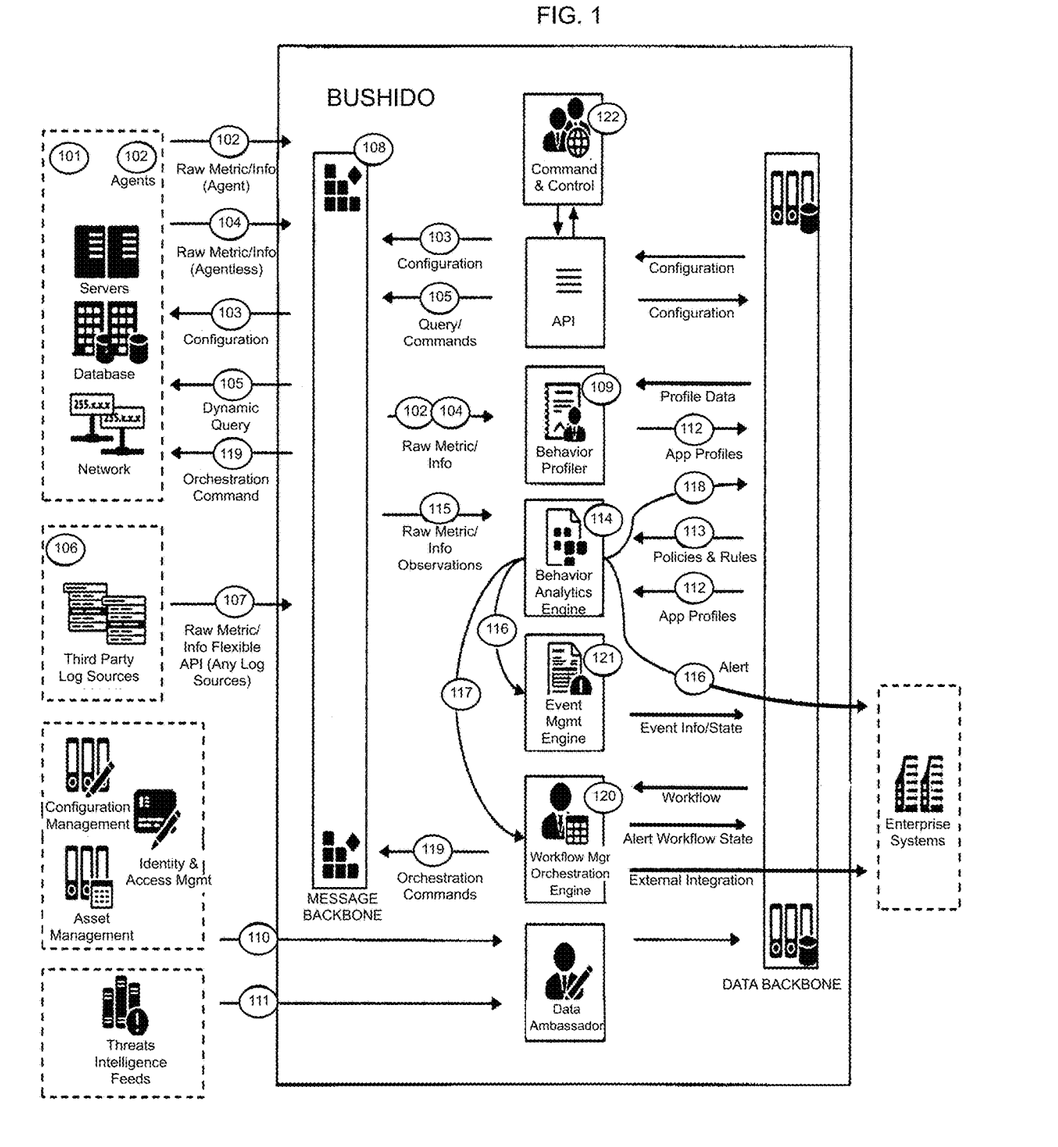
FIG. 1 depicts an illustrative operating environment in which various aspects of the present disclosure may be implemented in accordance with example embodiments.

A software agent runs on technology entities. It collects data and transmits the data via an encrypted channel to a Communications Bus (108). The collection and transmission frequency can be independently set to achieve flexibility in sampling frequency and optimization of network traffic bandwidth.

The agent collects all available system telemetries (cpu, memory, disk usage, network traffic and connections, system and user processes, network tables, etc.) based on the operating systems (e.g. Linux, Windows, Solaris, AIX, OSX, etc.)

The agent can be controlled via API (Application Programming Interface) to modify its collection method, frequency, and the scope of data being collected. It is also capable of accepting $3^{rd}$ party plugins from other providers to enhance and augment data collection methods. Examples of such plugins are specific database platform plugins and appliance plugins.

The agent is capable of self-healing and auto restart in the event it was terminated. This capability greatly reduces the complexity of the entire system and allows efficient self-monitoring of the system. This is achieved via a coupled watcher+agent configuration. The agent is capable of performing tasks on the operating system or applications running based upon instruction sent to it. Instructions are sent securely with validation from the Orchestration Engine.

For entities where installation of software agent is not possible or applicable, an agentless method can be deployed alternatively. Examples of these scenarios include proprietary devices such as appliances, GPS clocks, carrier telecommunications equipment, etc. The agentless method simply uses standard secured access such as SSH, API based data feeds, syslog, application logs to collect data.

Both Agent and Agentless method can also be co-deployed on the same entity to increase the reliability of the implementation to ensure there is more than one channel to collect the data. Data collection can be either a push or a pull model.

Besides regular data collection frequency, the software agent is also capable of running ad-hoc, on-demand queries to interrogate real-time present state for additional data that will improve precision of the analysis or threat detection. Such capability is initiated centrally via the Command & Control Console (122), and are executed in a highly parallelized manner to ensure the requested data are transmitted available within the same timeframe regardless of the number of entities or size of the total IT environment.

There are already many $3^{rd}$ party systems in the market that produces log data for those specific systems. Examples are Netflow from network devices, Opsec LEA logs from firewall devices, SDEE logs from Intrusion Prevention systems, custom application logging, etc.

Data collection can also be achieved via a flexible API (Application Programming Interface) that is compatible with virtually all forms of $3^{rd}$ party log sources. Examples are Netflow data from network devices. This method allows for rapid integration of new sources of data without lengthy delays that diminishes the value of such data.

The communications channel is designed to be horizontally scalable, globally replicable with no single points of failure. It employs a 'publish and subscribe' messaging model for message transmission. It is designed to run on readily available commodity hardware. It is the Message Backbone, one of the 2 Backbones of the infinitely scalable, infinitely resilient architecture. Also see FIGS. 3 and 4 for more details on the scale-out architecture.

The Profiling Engine performs a series of operations in real-time on the collected data to automatically create virtual application segmentation profile or white list application profile (112). First, it normalizes timestamps on all incoming data using UTC standard to ensure temporal synchronization that is critical to the analysis and correlation of events.

The data are then grouped into by minute, hourly, daily, weekly, monthly, and quarterly buckets by default. Such defaults can be further customized per profile. Standard statistical sampling techniques are applied on these data to record basic statistics such as min, max, mean, mode, average, standard deviation, etc.

Figure 2:
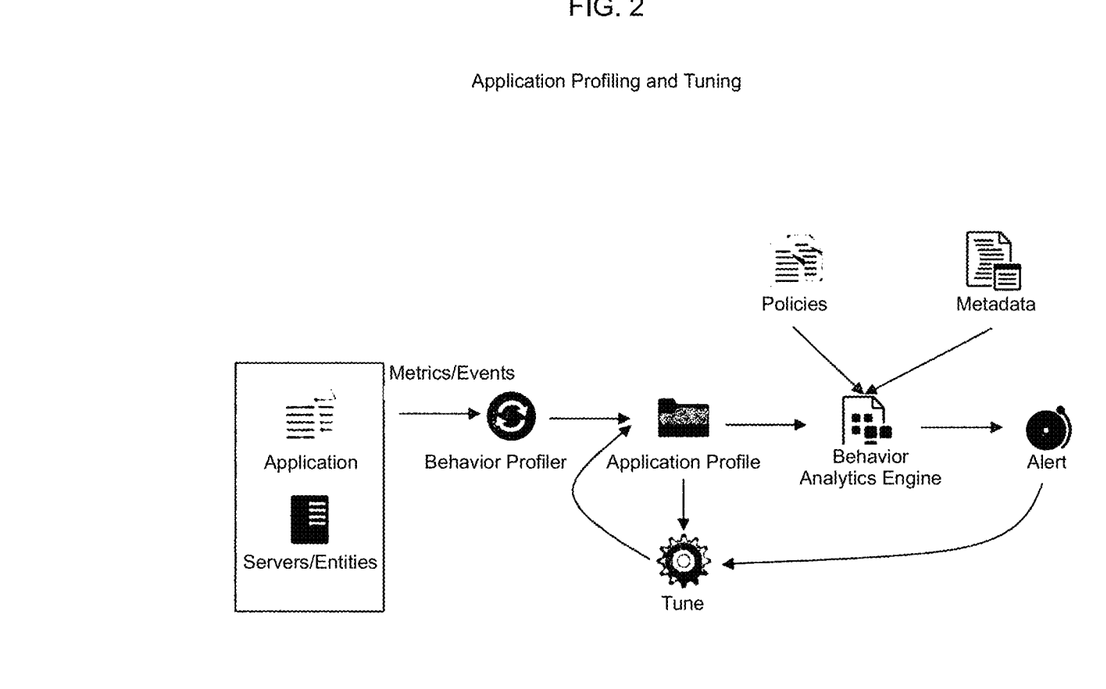
FIG. 2 depicts an illustrative flow diagram of application profiling and tuning that may be used to implement the processes and functions of certain aspects of the present disclosure in accordance with example embodiments.

Application profiles are generated by the Behavior Profile Engine referring to the application definition as the context and are essentially a summary of observed information within a specific time period. Combining Application Profiles, Policies and Metadata, the Behavior Analytics Engine can detect anomalies which can be manifested as an Alert. Application Profiles can be fine-tuned in two ways: (1) Through the Command and Control Interface, the administrator/user can modify/add/remove entries in the profile to further reflect the real world picture and (2) Utilizing the alerts generated by the Behavior Analytics Engine, the system can refer back to the events/metrics that caused the alert and use it to further refine the policy, minimizing false positives from happening. See FIG. 2.

The Data Ambassador component manages the reference data from technology asset management and configuration management systems. Correlation techniques are applied to the collected metrics in conjunction with this reference data to add contexts and improve analysis efficiencies and detection capabilities for multitude of scenarios.

After a default sampling period, which varies upon the intended timeframe buckets (i.e. hours, week, month, etc.), unique application patterns and behavioral profiles are identified based on these contextualized data and stored as application compartment profiles. This serves as the unique baseline profile for each of the applications upon which anomaly detection is referenced. This is also referred to as an application white listed profile.

Threats Intelligence feeds from standard industry sources are also incorporated into the profiling method and policies to provide additional context on the analysis. Examples are MAEC, CAPEC, STIX, and TAXII.

Figure 5:
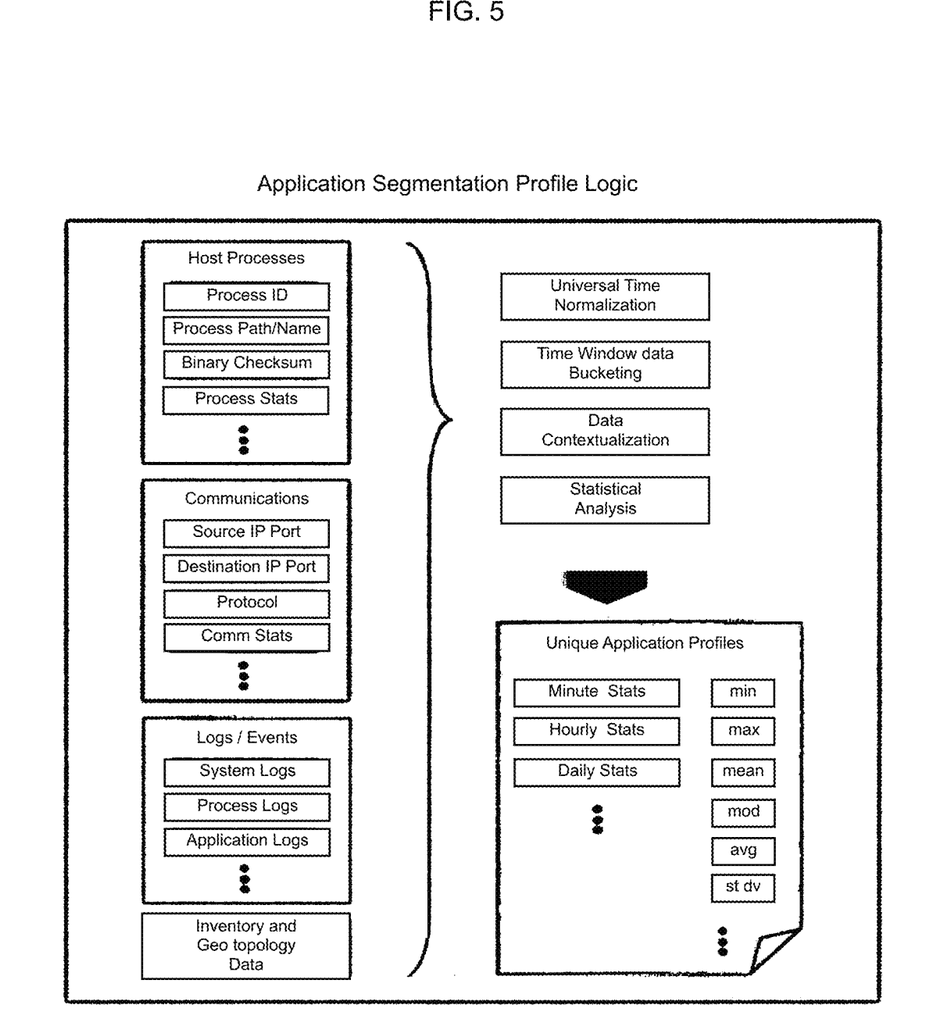
FIG. 5 illustrates application segmentation profile logic in accordance with example embodiments.

Unique Application profiles are automatically generated by the Profiling Engine, assigned an Application ID, and stored in the system. The profiles are generated based upon a sophisticated multi-variable time-series model, which includes application process consumption of system resources, open network ports, traffic characteristics, geographic topology, vector of system access, duration of access, interrelationship of various entities, etc. In essence this profile is a unique fingerprint of the application baseline. See FIG. 5 for additional details.

A software code binary integrity profile is also generated on critical application code and system binaries using checksum methods such as MD5 to enable tamper detection. Such tampering of application binaries are typical routes to compromise a system to obtain further access of theft of data. For Java based programs, additional optimization is achieved via checksum at the JAR collection level to optimize the operation. In addition to static checksum on application code residing on storage, the system also utilize a streamlining technique to checksum only running applications. This greatly reduces the tamper detection scope as only tampered running software are capable of further threats to the environment.

Besides the automatic discovery of application profile as aforementioned, there are two other methods to generate application profiles: Feed-based, and Manual.

Method 2: Feed-based profiles are generated from accepting feed data from sources such as systems of records or CMDB. Such records, if maintained accurately, can be used to construct application profiles based on business contexts that may not be automatically discovered. Such feed-based data are usually more useful as a supplement to the automatically discovered data from the Profiling Engine.

Method 3: Manually creating the profile based on known entities and relationship. This method is useful to preset existing entities into an application profile and subsequently allows the Profiling Engine to augment with behavioral baselines from the collected data. This flexibility allows for fine-tuning of the profile to include entities that may not have been discovered based on the Bushido modeling.

All the profiles generated by any of the above methods can be further customized and fine-tuned for better behavioral and accuracy. See FIG. 2 for detailed explanation of the profiling engine.

Policy engine provides default policies that govern the normalcy of an application profile and or specify security parameters to adhere to. Default policies describe various control parameters such as time-of-day, geographic location, resource consumption pattern, network access pattern, etc. that denotes a normal behavior. Security policies describe various control parameters such as avoidance rules, zero day threats, bad IP addresses, etc. These policies are fed into the behavioral analytics engine (114) to detect anomalies. The policy defaults are provided for each class of application types, and are fully customizable for each application profile.

Behavioral Analytics Engine is a complex event processing system that continuously monitors high-speed data streams from Communications Channel and makes observations (115). In conjunction with the Application Profiles (112) and Policies (113), the engine will detect data in real-time that indicates a behavior anomaly from the profile. Once an anomaly is detected, there are 3 primary actions to handle it.

Figure 6:
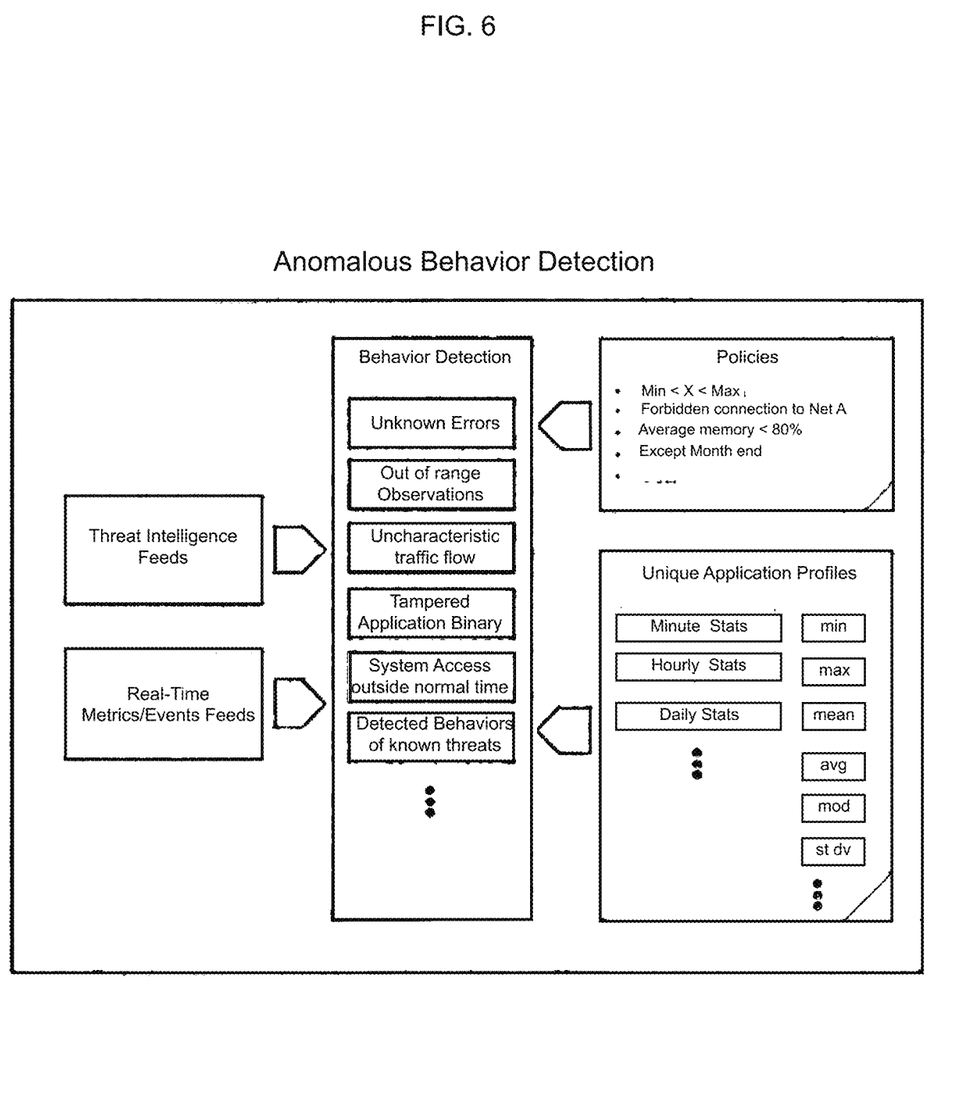
FIG. 6 illustrates an example flow chart and component diagram for anomalous behavior detection in accordance with example embodiments.

The behavior engine utilizes several techniques to detect behavioral anomalies. It uses computational checksum to detect tampering of application code and/or binaries on the operating system. It also analyses user and administrator access patterns against the access control databases and application profile to detect out of range behaviors, i.e. a user residing in the US accessing an application from a European device. It also performs context-based analyses on network port access patterns for each application processes, time-of-day, duration of activities, etc. to determine behavior deviations. See FIG. 6 for details of the detection logic Action 1: Produce an alert and route it to any alert management system within an enterprise. The alert will also route to an Event Management System (121) that will manage complete remedial actions lifecycle, from incident logging, action steps formulation, governance approvals, to execution of remedial steps.

Action 2: Informs the Orchestration Engine (120) to provide automatic lock-down or remediation of the environment and application. The automatic lock-down will prevent further infiltration and ensure the applications behave within the compartments or white list as described by their profiles.

Action 3: Update the application profile with this new behavior so as to customize the profile to include the behavior as part of the normal operating profile of the application.

The automatic lock-down feature utilizes OS kernel firewalling techniques that provide granular access controls at the application process level. The lock-down is executed by the software agent (102) and provides the capabilities to restrict an application or the entire operating system from communicating to specific target systems, specific network ports, and/or specific other applications.

The Orchestration Engine communicates with the software agent to affect the automatic lock-down during a detected event. Besides this direct interface, the orchestration engine also has a flexible workflow module that provides open architecture plug-in capabilities. The plug-in capability allows it to interface with many existing IT management software and systems in the marketplace, including vendor proprietary software as well as open source software. This flexibility allows it to orchestrate actions across a heterogeneous environment to comprehensively patch, reconfigure and addresses vulnerabilities in the environment. Such interfaces include cloud management software, databases and middleware platform management software, identity and directory services software, etc.

The Event Management Engine manages the complete lifecycle of an incident and event to ensure comprehensive remediation of the underlying vulnerabilities. These capabilities will integrate both automated functions, e.g. patch rollout as well as process oriented IT functions, e.g. approvals and controls. The module is fully compliant with ITIL framework. The Event Management Engine will affect patching and remediation actions via the Orchestration Engine (121).

The Command & Control Console provides a single comprehensive view of the state of all applications and systems in an enterprise. It also functions as a single point of control to manage environment configuration and vulnerability remediation. This single vantage point allows coordinated approach instead of fragmented efforts in ensuring security of the enterprise.

Built into the Command & Control Console is an Entitlement framework that enables fine-grained management of application and asset visibilities. Technology "entities" and applications can be naturally grouped based on locations, types, and activities. Custom filters can also be applied to achieve further groupings such as lines of businesses, critical applications, PII data segregation, etc. The intersection of both natural and customized groupings will provide very precise methods of how a certain groups of assets and applications can be managed or are visible to a certain groups of user.

A cluster consists of 1 to N number of identical nodes. Each node is a server executing all the components of architecture. This design supports infinite scale-out capability. One simply adds more nodes into a cluster to increase processing and data storage capacity. Since all nodes are identical, no complex customization is required, and all new nodes added will be automatically included in the cluster. This design also provide for infinite resiliency. As long as there is a running node, the cluster can withstand multiple node failures. The design also supports dynamic scaling back when nodes are removed from the cluster temporarily for maintenance, or permanently due to reduction in capacity need. Adding nodes to the cluster, expands the both storage and computing resources.

Figure 3:
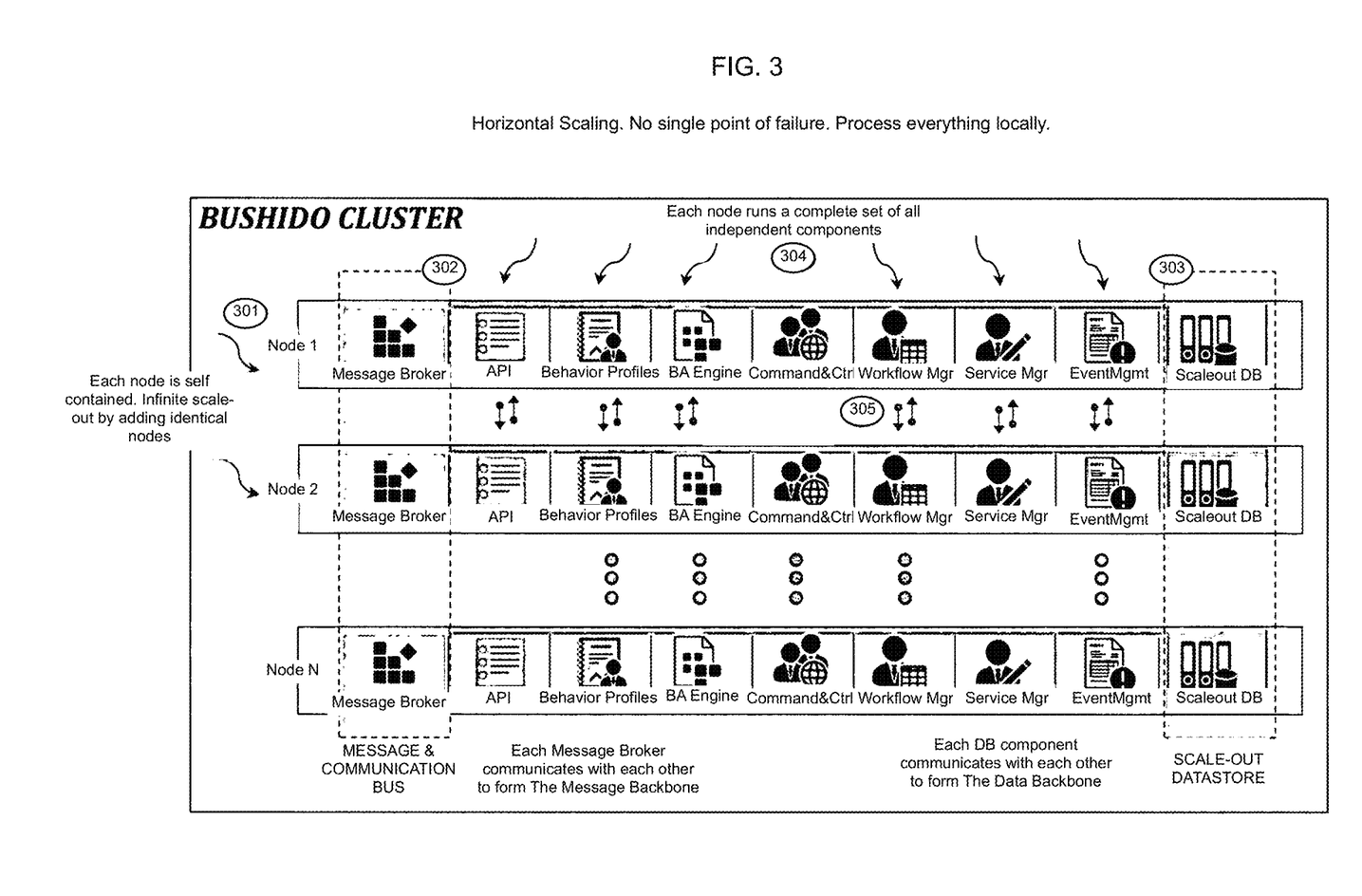
FIG. 3 illustrates Horizontal Scaling. No single point of failure, Process everything locally in accordance with example embodiments.

The Message Broker component within each node forms one of two Backbone of the system: The Messaging Backbone. These 2 backbones are the means of system's communication. These cluster of message brokers are designed to communicate with each other to understand states and to load-balance the messages being processed. This Message Backbone is responsible to transmit and receive all communication messages among many of the systems components (304) and between agents (102) and various feeds (107). It is also responsible to transmit commands intended to reconfigure agents or to lock-down (119) and remediate compromised applications.

The scale-out data-store component within each node forms the second system Backbone: The Data Backbone. The Data Backbone is responsible to store all persistent data as well as application profile data and monitoring policies. It also provides storage for event and incident management. Data-driven automation and orchestration will be able to use this backbone to perform required tasks. The system automatically detects modification of the nodes and dynamically balances the load accordingly.

Each node in the system runs a complete set of independent components that makes up the entire system/application ecosystem. Each component within the node communicates (305) with its peers across all other nodes within the cluster. The communication protocol is designed such that resiliency of the system is guaranteed down to the last component running in the cluster. The design also handles dynamic load balancing of the functions served by the component, as well as dynamic scale-out and scale-back when additional nodes are inserted or deleted from the cluster. Each component of the system can be scaled, by increasing the number of instances running. This can be done independent from each other. The message broker cluster (Message Backbone) serves as the low latency communications channel for all the components of the system. The components uses this layer for coordination, load balancing, and event notifications. The scale-out data store (Data Backbone) serves as the persistent data storage for each of the component.

All metrics, events, and actions are processed locally on a single cluster. Such cluster, dubbed Regional Cluster, is designed to service a geographic locale where devices are within tolerable network latency to ensure efficient data transmission and optimizes detection. A typical locale approximates the reach of a Metropolitan Area Network, usually a campus of 20 mile radius. Longer range processing are possible via the Global scaling design described below.

Figure 4:
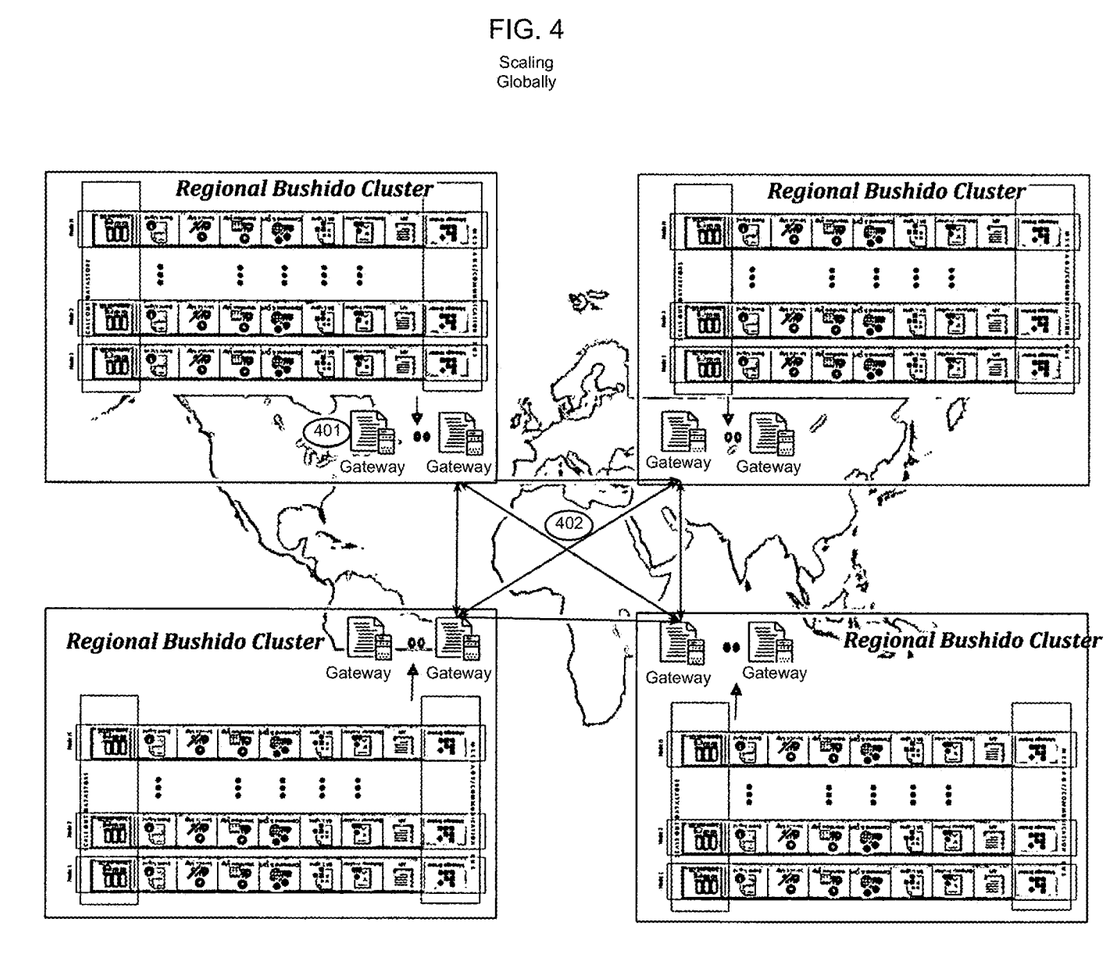
FIG. 4 illustrates scaling globally in accordance with example embodiments.

Each Regional Cluster communicates with each other via a scale-out Gateway. The Gateway server is responsible to send messages to Gateway server of other Regional Cluster. The Gateway servers are configured to subscribe to specific events and messages for forwarding to other regions (402). Once the metrics, events, and profiles are processed within the Regional Cluster, the results are sent back to the original Cluster. Periodically, data are synchronized across globally via the Gateways. With this configuration, once can be connected to any region and yet have the global visibility of the entire environment. All events from the agents within the cluster are processed locally within the cluster. The gateway processes are responsible for sending messages that to each of the regional clusters.

The gateway processes are configured to subscribe to specific events/messages for forwarding to other regions. The gateways processes are able to scale horizontally just like all other components of the system.

The invention claimed is:

1. A system for a complete application monitoring and cyber defense system based upon advanced application level segmentation, real-time behavior analytics, automatic application protection and full workflow orchestration for all enterprise technology to remediate immediate and residual threats, the system comprising a plurality of technology entities comprising information technology and data processing assets in an enterprise, said assets comprising one or more servers, desktops, network switches, routers, databases, mobile devices, and storage devices;

a software agent comprising computer programming instructions executable on a processor and configured to run on the technology entities, to collect data, to transmit the data via an encrypted channel to a Communications Bus, the collection and transmission frequency programmed to independently set changes in sampling frequency and for optimization of network traffic bandwidth, the software agent data comprising all available system telemetries comprising cpu, memory, disk usage, network traffic and connections, system and user processes, and network tables, and based on the operating system of each of the technology entities, including Linux, Windows, Solaris, AIX, and OSX;

the software agent controlled via API (Application Programming Interface) to modify a collection method, a frequency, and a scope of data being collected, the software agent programmed to accept 3rd party plugins relating to an additional data collection method, said plugins comprising database platform plugins and appliance plugins, the software agent programmed with a self-healing and auto restart module to run if the software agent is terminated, said self-healing and auto restart module having a coupled watcher+agent configuration component, the software agent programmed with a task module to perform tasks on each operating system and application running on the technology entities based upon task instructions sent to it, said task instructions are sent securely with validation from an Orchestration Engine, the software agent programmed with an on-demand module to run ad-hoc, on-demand queries to interrogate real-time present state of a technology entity, said queries comprising analysis and threat detection, the on-demand queries initiated centrally via a Command & Control Console, said queries executed in a parallelized manner so requested data is transmitted and available within a same timeframe regardless of the number of entities or size of the system;

a flexible API (Application Programming Interface) programmed to provide data collection, said API compatible with a plurality of 3rd party log sources and network devices for rapid integration of new sources of data without delay;

a Message Backbone comprising a communications channel that is horizontally scalable, globally replicable, and having no single points of failure, said communications channel programmed to employ a 'publish and subscribe' messaging model for message transmission, said communications channel programmed to run on readily available commodity hardware;

a Profiling Engine programmed to perform a series of operations in real-time on the collected data to automatically create virtual application segmentation profile or white list application profile by first, normalizing timestamps on all incoming data using UTC standard to ensure temporal synchronization that is critical to the analysis and correlation of events, then grouping the data by minute, hourly, daily, weekly, monthly, and quarterly buckets by default, and then applying standard statistical sampling techniques on the data to record basic statistics such as min, max, mean, mode, average, standard deviation;

a Behavior Profile Engine programmed to generate a plurality of Application profiles comprising an application definition and a summary of observed information within a specific time period;

said Behavior Analytics Engine programmed to combine Application Profiles, Policies and Metadata to detect anomalies which are manifested as an Alert;

a Command and Control Interface programmed to fine-tune said Application Profiles in two ways: (1) a administrator/user modifies/adds/removes entries in the application profile to further reflect the real world picture and (2) the Behavior Analytics Engine refers back to events/metrics that caused an alert and refines policy to minimize false positives;

a Data Ambassador component programmed to manage the reference data from a technology asset management system and a configuration management system, wherein correlation techniques are applied to collected metrics in conjunction with the reference data to add contexts and improve analysis efficiencies and detection capabilities for multitude of scenarios;

wherein, after a default sampling period, which varies upon the intended timeframe buckets selected from the group consisting of hours, days, weeks, and months, unique application patterns and behavioral profiles are identified based on these contextualized data and stored as application compartment profiles;

wherein the application compartment profiles serve as a unique baseline profile for each of the applications upon which anomaly detection is referenced, said unique baseline profile labelled as an application white listed profile;

wherein the Behavior Profiling Engine is programmed to automatically generate a plurality of Unique Application profiles, assign an Application ID, and store the Unique Application profiles in the system, wherein the Unique Application profiles are generated based upon a sophisticated multi-variable time-series model, which includes application process consumption of system resources, open network ports, traffic characteristics, geographic topology, vector of system access, duration of access, and interrelationship of various entities;

wherein the Behavior Profiling Engine is programmed to generate a software code binary integrity profile on critical application code and system binaries using checksum methods such as MD5 to enable tamper detection, wherein the Behavior Profiling Engine is programmed to optimize for Java based programs via checksum at the JAR collection level, wherein the Behavior Profiling Engine is programmed to utilize a streamlining technique to checksum only running applications to reduce the tamper detection scope as only tampered running software are capable of further threats to the environment;

wherein the Behavior Profiling Engine is programmed to generate a Feed-based application profile by accepting feed data from sources such as systems of records or CMDB;

wherein the Behavior Profiling Engine is programmed to accept manually created application profile based on known entities and relationship to preset existing entities into an application profile and allows the Behavior Profiling Engine to augment with behavioral baselines from the collected data;

a Policy engine is programmed to provide default policies that govern the normalcy of an application profile and specify security parameters to adhere to, wherein Default policies comprise control parameters for time-of-day, geographic location, resource consumption pattern, and network access pattern, that denotes a normal behavior, wherein Security policies comprise control parameters for avoidance rules, zero day threats, and bad IP addresses, wherein the Default policies and Security policies are fed into a Behavioral Analytics Engine to detect anomalies, said policy defaults are provided for each class of application types, and are fully customizable for each application profile;

the Behavioral Analytics Engine is programmed to provide a complex event processing system that continuously monitors high-speed data streams from Communications Channel and make observations, wherein the Behavioral Analytics Engine, in conjunction with the Application Profiles and Policies, detects data in real-time that indicates a behavior anomaly from the profile, wherein once an anomaly is detected, three (3) primary actions are programmed to handle the behavior anomaly;

said Behavioral Analytics Engine is programmed with detection logic to detect behavioral anomalies using computational checksum to detect tampering of application code and/or binaries on the operating system, and to analyse user and administrator access patterns against the access control databases and application profile to detect out of range behaviors, and to perform context-based analyses on network port access patterns for each application processes, time-of-day, and duration of activities, to determine behavior deviations;

wherein the three primary actions comprise:

Action: 1 Produce an alert and route it to an Alert Management System and to an Event Management System that performs a remedial actions lifecycle, comprising incident logging, action steps formulation, governance approvals, and execution of remedial steps;

Action 2: Inform an Orchestration Engine programmed to provide automatic lock-down or remediation of the environment and application, wherein the automatic lock-down prevents further infiltration and ensures the applications behave within the compartments or white list as described by their profiles;

Action 3: Update the application profile with this new behavior to customize the profile to include the behavior as part of the normal operating profile of the application;

wherein the automatic lock-down feature utilizes OS kernel firewalling techniques that provide granular access controls at the application process level, wherein the lock-down is executed by the software agent and provides the capabilities to restrict an application or the entire operating system from communicating to specific target systems, specific network ports, and/or specific other applications;

wherein the Orchestration Engine communicates with the software agent to affect the automatic lock-down during a detected event, wherein the orchestration engine has a flexible workflow module that provides open architecture plug-in capabilities, wherein the plug-in capability allows it to interface with existing IT management software and systems to orchestrate actions across a heterogeneous environment to comprehensively patch, reconfigure and addresses vulnerabilities in the system;

an Event Management Engine programmed to manage the complete lifecycle of an incident and event to ensure comprehensive remediation of the underlying vulnerabilities, and integrate patch rollout and process oriented IT functions for approvals and controls, wherein the Event Management Engine is fully compliant with ITIL framework, wherein the Event Management Engine provides patching and remediation actions via the Orchestration Engine;

a Command & Control Console programmed to provide a single comprehensive view of the state of all applications and systems in an enterprise, and to functions as a single point of control to manage environment configuration and vulnerability remediation to provide a coordinated approach, wherein the Command & Control Console comprises an Entitlement framework programmed for fine-grained management of application and asset visibilities wherein Technology Entities and applications are grouped based on locations, types, and activities, the Entitlement framework programmed with custom filters for grouping lines of businesses, critical applications, and Pll data segregation;

a Node module programmed to manage a cluster consists of 1 to N number of identical nodes, wherein each node is a server executing all the components of architecture, wherein adding more nodes into a cluster increases processing and data storage capacity, wherein all nodes are identical, wherein the Node module supports dynamic scaling for removing or adding nodes to the cluster, to remove or add storage and computing resources;

a Message Broker component within each node is programmed to form a Messaging Backbone programmed to provide a means of system communications, wherein a cluster of message brokers are programmed to communicate with each other to understand states and to load-balance the messages being processed, wherein the Message Backbone is responsible to transmit and receive all communication messages among many of the systems components and between agents and feeds, and transmits commands to reconfigure agents or to lock-down and remediate compromised applications;

a Scale-out Data-store component within each node is programmed to form a Data Backbone, wherein the Data Backbone stores persistent data and application profile data and monitoring policies, wherein the Data Backbone provides storage for event and incident management, wherein Data-driven automation and orchestration will be able to use this backbone to perform required tasks, wherein the system automatically detects modification of the nodes and dynamically balances the load;

wherein each node in the system runs a complete set of independent components that makes up the entire system/application ecosystem, wherein each component within the node communicates with its peers across all other nodes within the cluster, wherein the communication protocol is programmed to guarantee resiliency of the system down to the last component running in the cluster, a Regional Cluster locally processes all metrics, events, and actions, said Regional Cluster programmed to service a geographic locale where devices are within tolerable network latency to ensure efficient data transmission and optimizes detection, wherein each Regional Cluster communicates with each other via a scale-out Gateway, wherein the Gateway server is programmed to send messages to Gateway server of other Regional Cluster, wherein the Gateway servers are programmed to subscribe to specific events and messages for forwarding to other regions, wherein once the metrics, events, and profiles are processed within the Regional Cluster, the results are sent back to the original Cluster, wherein the Gateways are programmed to periodically synchronize data globally via the Gateways. With this configuration, once can be connected to any region and yet have the global visibility of the entire environment, wherein events from the agents within the cluster are processed locally within the cluster, wherein the gateway processes are programmed to send messages to each of the regional clusters, wherein the gateway processes are programmed to subscribe to specific events/messages for forwarding to other regions, and wherein the gateways processes are programmed to scale horizontally.

2. The system of claim 1, further comprising an agentless method module programmed for entities where installation of software agent is not possible or applicable, including proprietary devices such as appliances, GPS clocks, and carrier telecommunications equipment, wherein the agentless method module is programmed to use standard secured access comprising SSH, API based data feeds, syslog, and application logs to collect data, wherein both Agent and Agentless method are co-deployed on the same entity to increase the reliability of the implementation to ensure there is more than one channel to collect the data, wherein data collection can be either a push or a pull model.

3. The system of claim 1, further comprising wherein the profiling method and policies incorporate threats Intelligence feeds from standard industry sources comprising MAEC, CAPEC, STIX, and TAXII.

4. The apparatus of claim 3, wherein the plurality of behavior metrics includes at least one of application process consumption of system resources, open network ports, traffic characteristics, geographic topology, vector of system access, duration of access, interrelationship of various entities.

* * * * *